US012547105B2

(12) United States Patent
Tsuruya

(10) Patent No.: US 12,547,105 B2
(45) Date of Patent: Feb. 10, 2026

(54) FIXING DEVICE HAVING CONDUCTIVE LAYER CONFIGURED TO MINIMIZE DAMAGE TO FIXING DEVICE

(71) Applicant: CANON KABUSHIKI KAISHA, Tokyo (JP)

(72) Inventor: Takaaki Tsuruya, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/754,017

(22) Filed: Jun. 25, 2024

(65) Prior Publication Data

US 2025/0004403 A1 Jan. 2, 2025

(30) Foreign Application Priority Data

Jun. 28, 2023 (JP) ................................ 2023-105937

(51) Int. Cl.
*G03G 15/20* (2006.01)

(52) U.S. Cl.
CPC ..... *G03G 15/2053* (2013.01); *G03G 15/2039* (2013.01); *G03G 15/2064* (2013.01); *G03G 2215/2035* (2013.01)

(58) Field of Classification Search
USPC ........................................................ 399/329
See application file for complete search history.

(56) References Cited

U.S. PATENT DOCUMENTS

2017/0146936 A1 5/2017 Eguchi

FOREIGN PATENT DOCUMENTS

| | | | |
|---|---|---|---|
| JP | 2001154518 | A | 6/2001 |
| JP | 2011118164 | A | 6/2011 |
| JP | 2014026267 | A | 2/2014 |
| JP | 2017223819 | A | 12/2017 |
| JP | 2018091951 | A | 6/2018 |

OTHER PUBLICATIONS

Text in English for JP2018-091951A to Akira et al., cited by applicant. (Year: 2018).*

* cited by examiner

*Primary Examiner* — Quana Grainger
(74) *Attorney, Agent, or Firm* — Canon U.S.A., Inc. IP Division

(57) ABSTRACT

In the fixing device according to the present invention, a relationship D>R+C−F is satisfied where F is a width of a film. C is a width of a conductive layer. R is a distance between two restriction surfaces, and D is a width of a pressure member.

14 Claims, 15 Drawing Sheets

INNER SURFACE

SIDE SURFACE

TOP SURFACE

VERTICAL CROSS SECTION

FIXING DEVICE HAVING CONDUCTIVE LAYER CONFIGURED TO MINIMIZE DAMAGE TO FIXING DEVICE

BACKGROUND OF THE INVENTION

Field of the Invention

The present invention relates to a fixing device that is included in an image formation apparatus such as an electrophotographic copying machine or an electrophotographic printer.

Description of the Related Art

Japanese Patent Application Laid-Open No. 2014-26267 discusses, as a mode of a fixing device mounted in an electrophotographic printer or the like, a fixing device in which a cylindrical film (also called belt) with a conductive layer is used and electric current flows to the conductive layer to cause the film to generate Joule heat.

The fixing device in which the film is used includes a restriction member that restricts the movement (shift movement) of the film in the longitudinal direction of the film.

In a case where a configuration is adopted in which the shift movement is restricted by the restriction member, if a film shifting force becomes stronger in a state where the restriction member receives the end surfaces of the film, the film may become damaged. In the fixing device in which electric current flows into the film and the film generates heat, if the film becomes damaged at the position where the current flows, the electrical resistance may increase to cause heat generation failure or abnormal heat generation.

SUMMARY OF THE INVENTION

The present invention is directed to providing a fixing device in which increase in the electrical resistance of the conductive layer can be suppressed.

According to the present invention, a fixing device that fixes a toner image formed on a recording medium to the recording medium includes a cylindrical film that includes a base layer and a conductive layer lower in resistance than the base layer, a member-to-be-slid-contact that is arranged in an internal space of the film and with which the rotating film comes into slide contact, a pressure member that contacts an outer peripheral surface of the film, the pressure member nipping the film together with the member-to-be-slid-contact to form a fixing nip portion between the film and the pressure member, and a restriction member that has a restriction surface configured to restrict movement of the film in a longitudinal direction of the film when the film moves in the longitudinal direction, wherein in the fixing device, electrical current flows to the conductive layer in a circling direction to cause the conductive layer to generate Joule heat, and the recording medium nipped and conveyed by the fixing nip portion is heated with the heat, thereby the toner image formed on the recording medium is fixed to the recording medium, wherein the restriction member is arranged at positions facing end surfaces of the film in the longitudinal direction, wherein, with respect to the longitudinal direction, the conductive layer into which the electric current flows in the circling direction is not provided in areas of the end portions of the film but is provided in an area between the areas of the end portions, and wherein, with respect to the longitudinal direction, a relationship $D>R+C-F$ is satisfied, where F is a width of the film, C is a width of the conductive layer, R is a distance between the two restriction surfaces, and D is a width of the pressure member.

Further features of the present invention will become apparent from the following description of exemplary embodiments with reference to the attached drawings.

DESCRIPTION OF THE EMBODIMENTS

Figure 1:
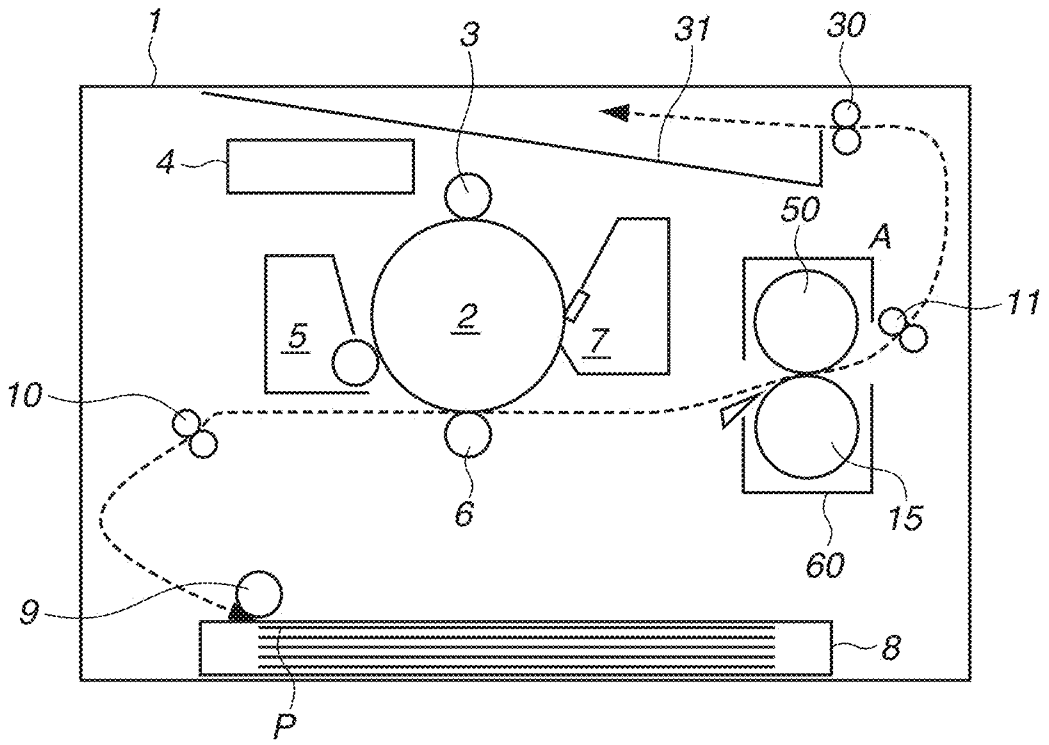
FIG. 1 is a cross-sectional view of a schematic configuration of an image formation apparatus.

A first exemplary embodiment will be described. FIG. 1 is a cross-sectional view of a schematic configuration of a laser beam printer 1 (hereinafter, called printer 1) that is an image formation apparatus that forms a toner image on a recording medium P using electrophotographic technologies. The printer 1 is an A4 printer that supports the recording medium P of letter size (215.9 mm wide).

The printer 1 includes a photoconductive drum 2 that is an image bearing member, a charging unit 3 that charges the surface of the photoconductive drum 2 in a substantially even manner, and a scanner unit 4 that scans the photoconductive drum 2 with laser beams in accordance with image information to form an electrostatic latent image on the photoconductive drum 2. The printer 1 further includes a developing unit 5 that develops the electrostatic latent image with toner, a transfer member 6 that transfers the toner image on the photoconductive drum 2 onto the recording medium P, and a cleaning unit 7 that removes the toner that has not been transferred onto the recording medium P and has been left on the photoconductive drum 2. The printer 1 further includes a fixing device A that fixes the toner image having transferred onto the recording medium P to the recording medium P. The fixing device A will be described below in detail.

A cassette 8 that stores the recording medium P such as paper is attached to the lower part of the printer 1. Recording media P stored in the cassette 8 are fed one by one by a roller 9. The recording medium P having been fed is conveyed by conveyance rollers 10, 11, and 30, the transfer member 6, the fixing device A, and others, and is finally ejected to an ejection tray 31 through a dotted-line path illustrated in FIG. 1.

Figure 2:
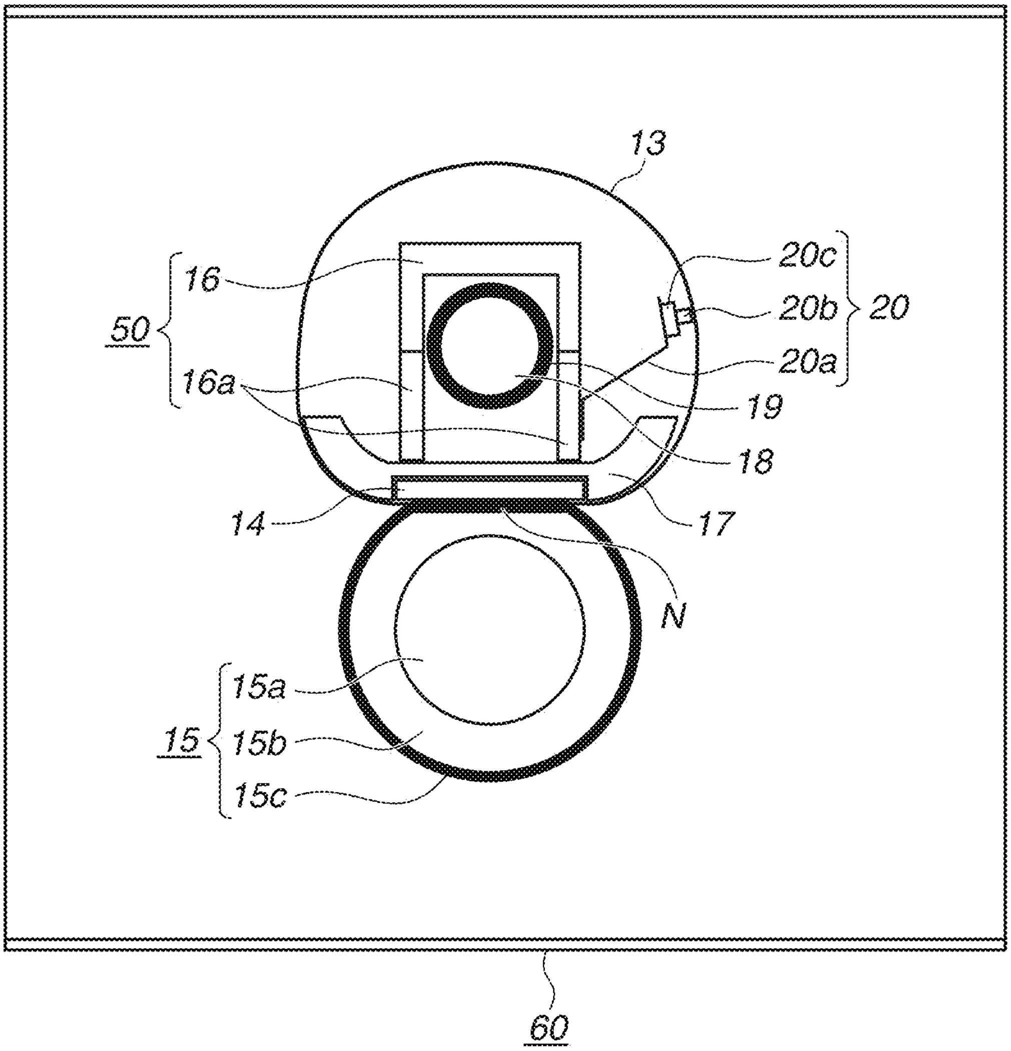
FIG. 2 is a cross-sectional view of a fixing device.
Figure 3:
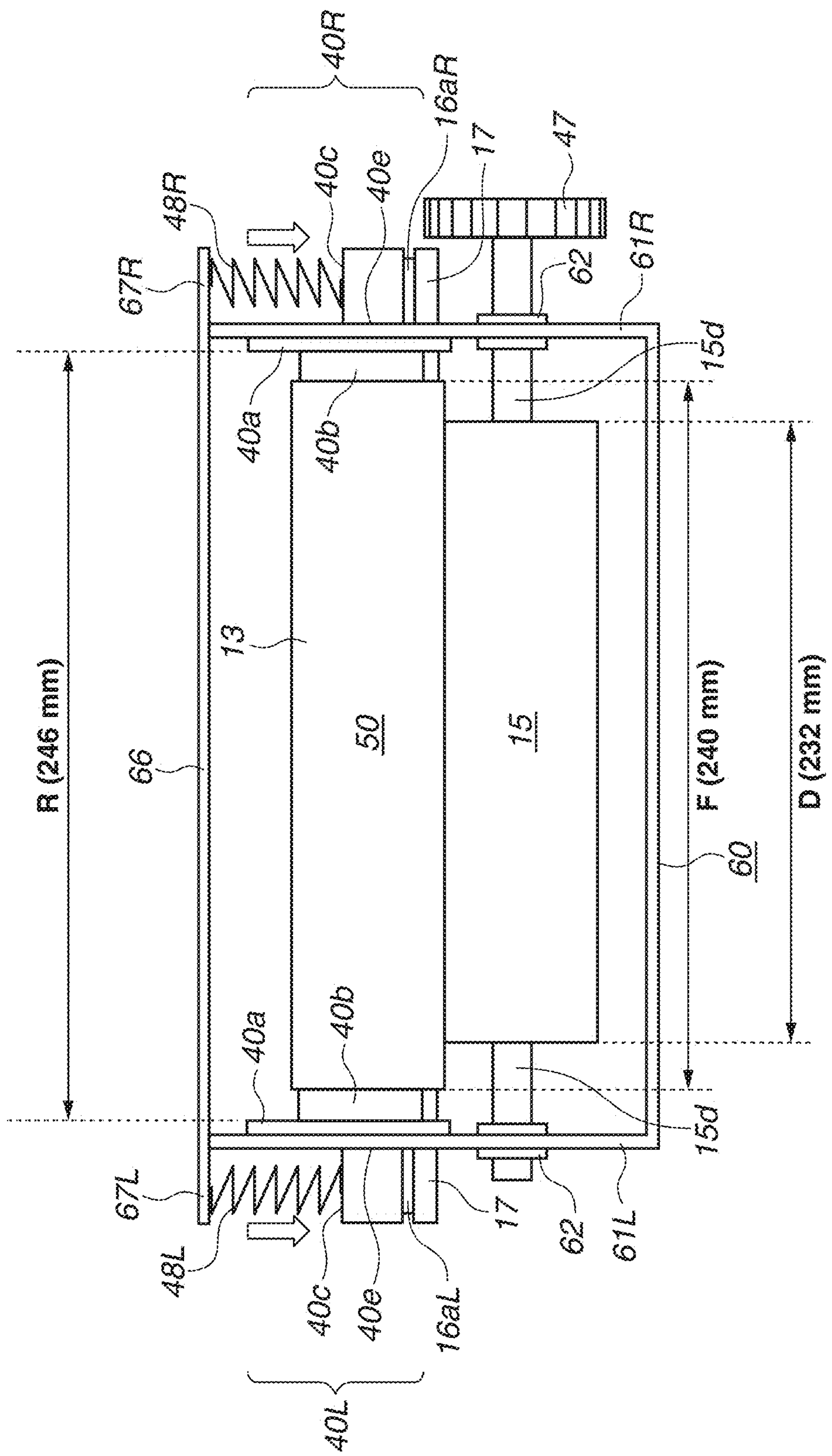
FIG. 3 is a front view of the fixing device.
Figure 4:
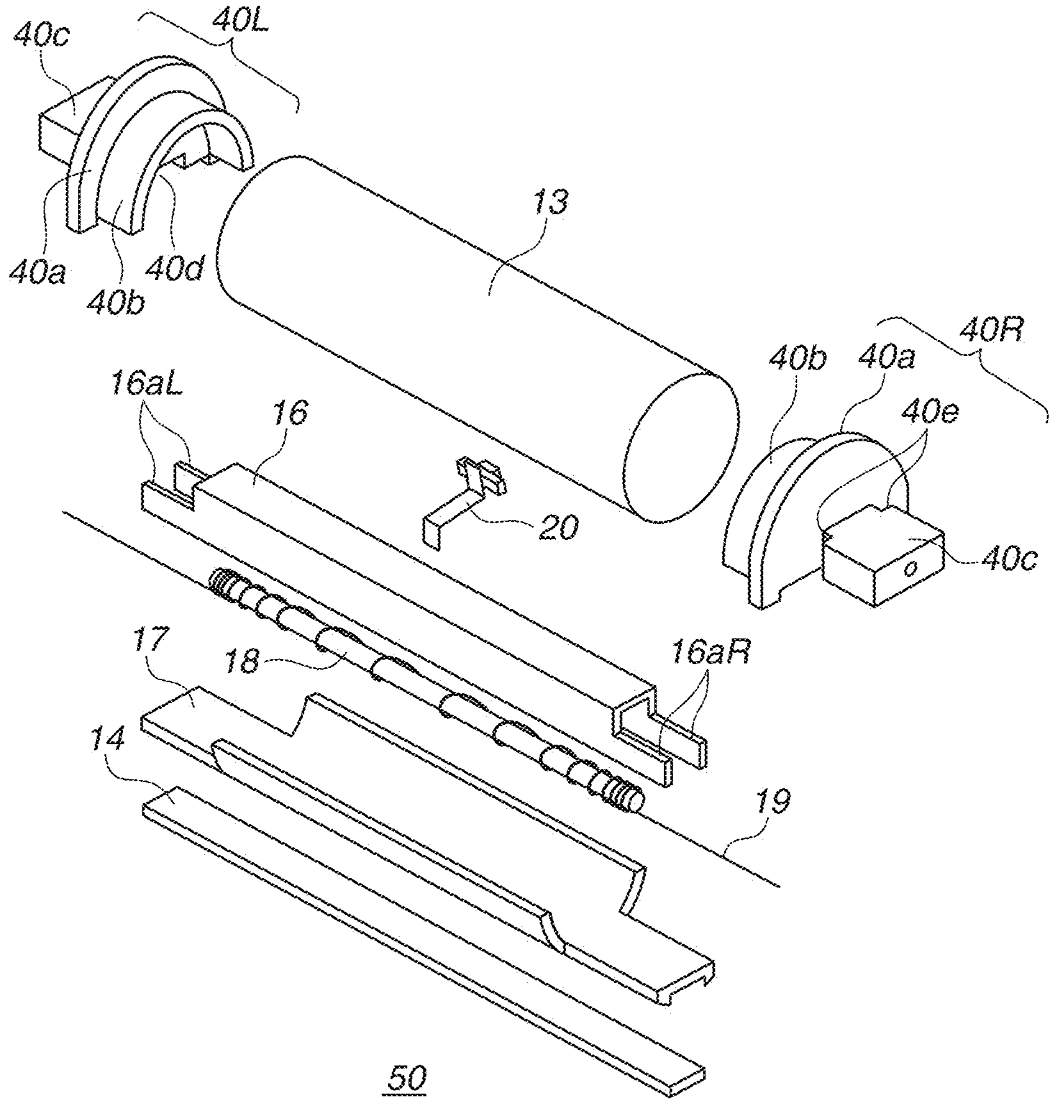
FIG. 4 is an exploded perspective view of a film unit.

The fixing device A (fixing unit) will be described in detail. FIG. 2 is a cross-sectional view of the fixing device A, FIG. 3 is a front view of the fixing device A, and FIG. 4 is an exploded perspective view of a film unit 50. The front side of the fixing device A is the entry side where the recording medium P enters the fixing device A, and the rear side of the fixing device A is the exit side where the recording medium P exits from the fixing device A. The left side is defined as viewed from the front side of the fixing device A (that is, in FIG. 3), and the right side is defined as viewed from the front side of the fixing device A. The fixing device A is an electromagnetic induction heating fixing device. The fixing device A is roughly divided into the film unit 50, a pressure roller 15 as a pressure member, and an apparatus frame 60 that contains these unit and roller.

The film unit 50 includes a cylindrical film 13, a member-to-be-slid-contact 14 with which the rotating film 13 is in slide contact, a guide member 17 that holds the member-to-be-slid-contact 14, and a metallic stay 16 that secures the rigidity of the fixing device A. The film unit 50 further includes an energizing coil 19 that is arranged in the internal space of the film 13 and has a helical part with a helical axis substantially parallel to the longitudinal direction of the film 13, and a magnetic core 18 that has end surfaces and is arranged in the helical part. The film unit 50 further has a temperature sensor 20 that is in contact with the inner surface of the film 13 and detects the temperature of the film 13, and a flange 40 (restriction member) that is arranged at either end of the stay 16 in the longitudinal direction of the film 13. The flange 40 has a restriction surface that restricts the movement of the film 13 in the longitudinal direction of the film 13 when the film 13 moves in the longitudinal direction of the film 13.

The member-to-be-slid-contact 14, the stay 16, the guide member 17 are all members longer than the width (lateral length) of the film 13, and their left and right sides extend from both of the end portions of the film 13 to the outside of the film 13. A flange 40L fits to a left protruding part 16*a*L of the stay 16, and a flange 40R fits to a right protruding part 16*a*R of the stay 16. That is, the flanges 40L and 40R are arranged at positions facing the end surfaces of the film 13 in the longitudinal direction of the film 13.

Figure 5:
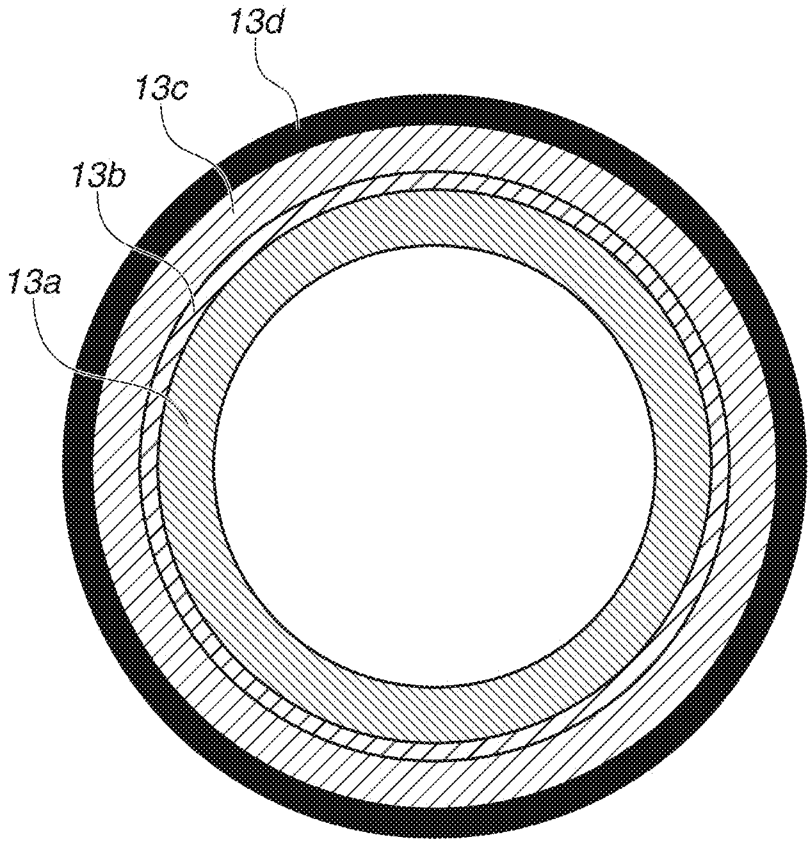
FIG. 5 is a cross-sectional configuration diagram of a film.

The film 13 will be described. FIG. 5 is a cross-sectional configuration diagram of the central part of the film 13 in the longitudinal direction of the film 13. The film 13 has a base layer 13*a*, a conductive layer 13*b*, a protective layer 13*c*, and a release layer 13*d*. In the film 13, due to induced electromotive force, induction current flows into the conductive layer 13*b* with low electrical resistance, and the conductive layer 13*b* generates Joule heat. The base layer 13*a* is desirably made of a material higher in resistance value than the conductive layer 13*b* in order to secure insulation properties between the conductive layer 13*b* through which the induction current flows and the members arranged in the internal space of the film 13. The base layer 13*a* is also required to have heat resistance. Thus, the material of the base layer 13*a* is preferably an insulating heat-resistance resin such as polyimide, polyamide imide, polyether ether ketone (PEEK), or polyether sulfone (PES). The base layer 13*a* in the present exemplary embodiment has an inner diameter of 30 mm, a width F of 240 mm, and a thickness of about 40 μm, and its material is polyimide.

The conductive layer 13*b* is a resistive heat generation member that is lower in electrical resistance than the base layer 13*a* and the protective layer 13*c*.

The material of the conductive layer 13*b* is preferably a metal with a low volume resistivity such as iron, copper, silver, aluminum, nickel, chrome, tungsten, SUS304 (stainless steel) containing these metals, or nichrome. If its volume resistivity is low, a conductor such as carbon fiber reinforced plastic (CFRP) or carbon nanotube may be used. A method for forming the conductive layer 13*b* is coating, plating, sputtering, evaporation, or the like. The conductive layer 13*b* in the present exemplary embodiment is formed of copper with a thickness of about 2 μm by an electric plating method. The width (lateral length) of the conductive layer 13*b* is larger than the width of the recording medium P of the maximum size that is usable in the printer 1, and is shorter than the width of the base layer 13*a*. In the present exemplary embodiment, the conductive layer 13*b* is formed on the base layer 13*a* by electric plating with both of the end portions of the base layer 13*a* masked by 8 mm such that the conductive layer 13*b* has a width C of 224 mm. Because the conductive layer 13*b* is not present in the areas of both of the end portions of the film 13, the film 13 in the areas of both of the end portions has the cross section illustrated in FIG. 5 from which the conductive layer 13*b* is removed.

The protective layer 13*c* is provided for the purpose of preventing deterioration of the conductive layer 13*b* made of copper due to oxidation. For the same reason as that of the base layer 13*a*, the protective layer 13*c* is desirably higher in resistance than the conductive layer 13*b* and is preferably made of an insulating heat-resistance resin. The protective layer 13*c* in the present exemplary embodiment is made of polyimide with a thickness of about 20 μm.

The material of the release layer 13*d* is preferably material excellent in releasing and heat-resistance properties such as perfluoro alkoxy alkane (PFA), polytetrafluoroethylene (PTFE), or fluorinated ethylene propylene (FEP). The release layer 13*d* in the present exemplary embodiment is a PFA tube with a thickness of about 15 μm. An elastic layer of sponge or rubber may be provided between the release layer 13*d* and the protective layer 13*c*. The provision of the elastic layer allows the surface of the film 13 to easily follow the asperities on the surface of the recording medium P, thereby improving the adhesiveness to the toner image. This makes it possible to reduce uneven heating of the toner image and obtain a favorable image with less uneven gloss. For the purpose of reinforcing the adhesiveness between the layers, a primer layer may be provided between the layers.

The member-to-be-slid-contact 14 will be described. The member-to-be-slid-contact 14 is required to be excellent in sliding on the inner surface of the film 13 and have heat resistance. The member-to-be-slid-contact 14 in the present exemplary embodiment is formed of a base material with a surface layer on the surface with which the film 13 comes into slide contact. The base material is preferably a heat-resistance resin such as polyimide, polyamide imide, PEEK, or PES or a metal such as aluminum or iron. In the present exemplary embodiment, pure aluminum with a thickness of 0.8 mm is used as the base material. The surface layer is a PTFE coat with a thickness of about 30 μm that is low in resistance of sliding on the inner surface of the film 13 and is excellent in heat resistance and abrasion resistance. A heat-resistance lubricant is intervened between the member-to-be-slid-contact 14 and the film 13 in order to further reduce a sliding resistance between the member-to-be-slid-contact 14 and the film 13. As the lubricant, fluorine-based or silicone-based grease or oil is preferred. The lubricant in the present exemplary embodiment is fluorine grease in which a fluorine oil base is mixed with PTFE as a thickener.

The guide member 17 will be described. The guide member 17 is a member made of a heat-resistance resin, and supports the member-to-be-slid-contact 14 and has the function of guiding the rotation of the film 13. The guide member 17 has a groove portion on the lower surface along the longitudinal direction of the film 13, and the member-to-be-slid-contact 14 is fitted into and supported by the groove portion, such that the surface with which the film 13 is in slide-contact faces outside. As the material of the guide member 17, a heat-resistance resin such as a liquid crystal polymer, a phenol resin, polyphenylene sulfide (PPS), or PEEK is preferred. In the present exemplary embodiment, the guide member 17 is made of a liquid crystal polymer.

Figure 6:
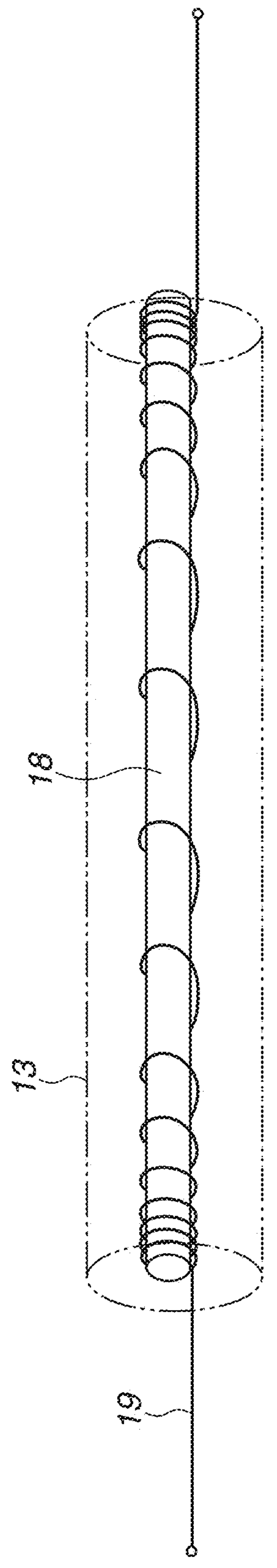
FIG. 6 is a perspective view of a magnetic core and an energizing coil.

A magnetic flux generation unit will be described. A magnetic core 18 and an energizing coil 19 are provided as a magnetic flux generation unit in the internal space of the stay 16 with an angular C-shaped cross section. FIG. 6 is a perspective view of the magnetic core 18 and the energizing coil 19, where the energizing coil 19 is wound around the outer periphery of the magnetic core 18 in a helical form. The magnetic core 18 has a columnar shape with end surfaces, and is arranged in almost the center of the film 13 in the radial direction of the film 13. The magnetic core 18 plays the roles of inducing magnetic lines (magnetic flux) of an alternating magnetic field generated by the energizing coil 19 and forming a path of the magnetic lines (magnetic path). The material of the magnetic core 18 is preferably a material that causes small iron loss (hysteresis loss and eddy-current loss) and has high relative magnetic permeability, and for example, a ferromagnetic body with high magnetic permeability such as calcined ferrite or ferrite resin is preferred. The cross-sectional shape of the magnetic core 18 is preferably a shape that can be stored in the internal space of the film 13 and has as large cross section area as possible. Although the cross section does not need to be circular, the cross-sectional shape is preferably close to a circular shape because in winding the energizing coil 19 around the magnetic core 18, the shorter length of the linear material causes a small copper loss (coil current Joule loss). The magnetic core 18 in the present exemplary embodiment is made of ferrite with a diameter of 10 mm and a length of 245 mm. The energizing coil 19 is formed by winding a copper linear material (single conductive wire) with a diameter of 1 to 2 mm coated with heat-resistance polyamide imide around the magnetic core 18 in a helical form. The number of turns is 18. The energizing coil 19 has a helical axis parallel to the axial direction of the magnetic core 18. When high-frequency current flows into the energizing coil 19, induction current flows into the conductive layer 13*b* and the conductive layer 13*b* generates heat on the principle described below. In this manner, the fixing device A includes the energizing coil 19 that is arranged in the internal space of the film 13 and has the helical part with the helical axis substantially parallel to the longitudinal direction and the magnetic core 18 that has end surfaces and is arranged inside the helical part. Applying an alternating-current (AC) voltage to the energizing coil 19 generates induction current in the conductive layer 13*b*.

Figure 7:
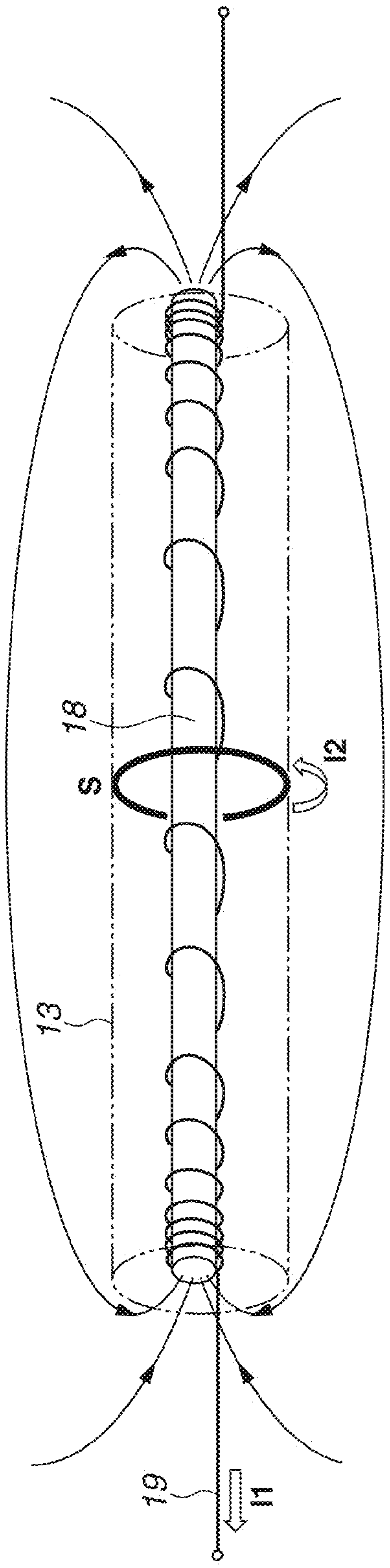
FIG. 7 is a diagram illustrating an alternating magnetic field and a part of induction current.

The principle of induction heat generation in the fixing device A according to the present exemplary embodiment will be described. FIG. 7 is a conceptual diagram illustrating the moment when the current flowing into the energizing coil 19 in the direction of arrow I1 is increasing. When high-frequency current flows into the energizing coil 19, the fixing device A forms a magnetic field in which most (90% or more) of the magnetic flux extending from one end of the magnetic core 18 passes the outside of the film 13 and returns to the other end of the magnetic core 18. In FIG. 7, S indicates a part of induction current (circling current) flowing in the conductive layer 13*b*. When such a magnetic field is formed, the induction current flows in the direction of arrow I2.

A temperature detection unit will be described. Because the conductive layer 13*b* of the film 13 generates heat on the principle described above, the temperature detection unit is desirably configured to directly detect the temperature of the film 13 itself. Thus, as illustrated in FIG. 2, the temperature sensor 20 as the temperature detection unit is in contact with the inner surface of the film 13. The temperature sensor 20 includes a plate spring 20*a* with one end fixed to the stay 16, a thermistor (temperature detection element) 20*b* that is placed at the other end of the plate spring 20*a*, and a sponge 20*c* that intervenes between the plate spring 20*a* and the thermistor 20*b*. The surface of the thermistor 20*b* is covered with a polyimide tape with a thickness of 50 μm (not illustrated) in order to secure sliding property and electrical insulating property with respect to the inner surface of the film 13. The sponge 20*c* functions as a heat insulating material for the thermistor 20*b* and also has the function of causing the thermistor 20*b* to flexibly fit to the film 13 that is the measurement target.

The flange 40 will be described. The flanges 40L and 40R are arranged at positions facing the end surfaces of the film 13 in the longitudinal direction of the film 13. The flange 40L and the flange 40R have a symmetrical shape and are molded articles of a heat-resistance resin.

Figure 8A:
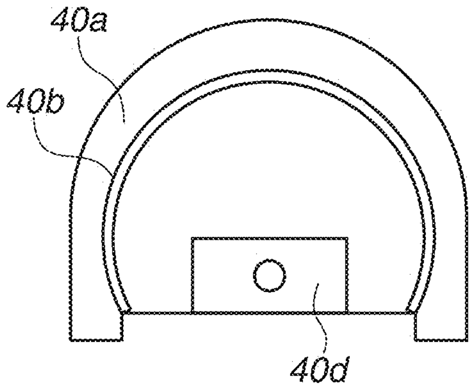
FIGS. 8A to 8D are diagrams describing a structure of a flange.
Figure 8B:
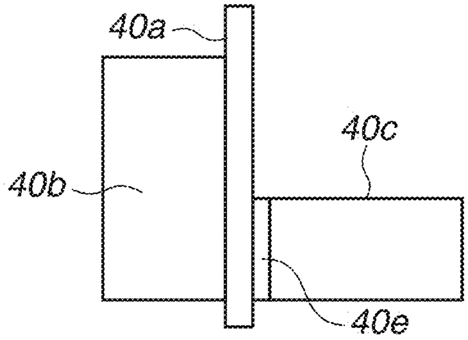
Figure 8C:
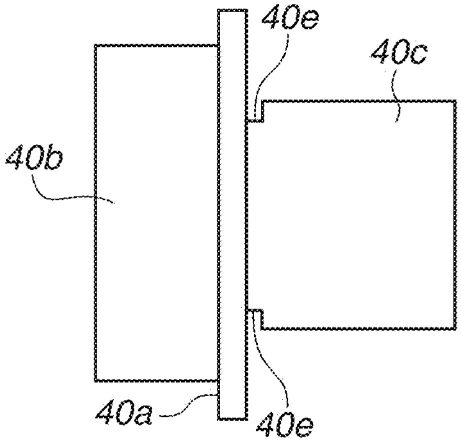
Figure 8D:
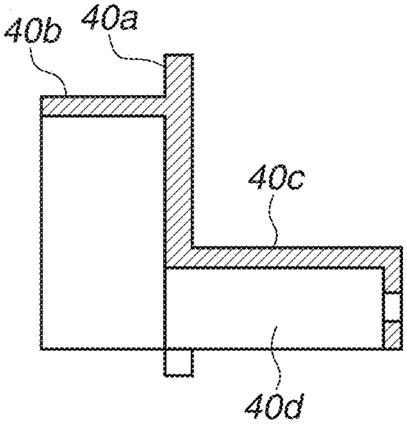

FIGS. 8A, 8B, and 8C are diagrams illustrating the flange 40 as viewed from the inner side, the lateral side, and the top side, respectively, and FIG. 8D is a vertical cross-sectional view of the flange 40. As illustrated in these drawings, the flanges 40L and 40R each have a restriction surface 40*a*, a guide surface 40*b*, a force receiving part 40*c*, a fitting part 40*d*, and a vertical groove part 40*e*. The restriction surface 40*a* faces the end surface of the film 13, and is the surface with which the end surface of the film 13 comes into contact when the film 13 moves in the longitudinal direction. Accordingly, the restriction surface 40*a* plays the role of restricting the movement (lateral shift) of the film 13, and keeps the film 13 at a predetermined position in the longitudinal direction. The guide surface 40*b* guides the inner surface of the rotating film 13 in the end portion area of the film 13 in the longitudinal direction. That is, the guide surface 40*b* supports the inner peripheral surface of the longitudinal end portion of the film 13 from the inside, thereby playing the role of causing the film 13 to draw a desired rotation trajectory. The fitting part 40*d* is a part that fits to the protruding part 16*a* of the stay 16. The fitting part 40*d* has a hole for connecting the energizing coil 19 and a power supply circuit (not illustrated). The force receiving part 40*c* is a surface that receives biasing force of a pressure spring 48L or 48R for forming a fixing nip portion N, and the back surface of the force receiving part 40*c* is in direct contact with the protruding part 16*a* of the stay 16. The force receiving part 40*c* plays the role of receiving the biasing force of the pressure spring 48L or 48R to press the stay 16 downward. The flange 40 is made of a glass fiber-contained resin such as PPS, liquid crystal polymer, polyethylene terephthalate (PET), or polyamide (PA), as a material excellent in heat resistance, relatively low in heat conductivity, and excellent in sliding performance. In the present exemplary embodiment, the flange 40 is made of PPS.

The pressure roller 15 is in contact with the outer peripheral surface of the film 13, and forms the fixing nip portion N together with the member-to-be-slid-contact 14, with the film 13 therebetween. The pressure roller 15 also has the role of a driving roller that rotates the film 13. The pressure roller 15 has a metal core 15*a* and an elastic layer 15*b* that is concentrically molded around the metal core 15*a* in a roller form to coat the metal core 15*a*. The pressure roller 15 is a roller with an outer diameter of 30 mm and a width D (length of the elastic layer 15*b*) of 232 mm and has the release layer 15*c* as a surface layer. The elastic layer 15*b* is desirably made of a material excellent in heat resistance, and silicone rubber, fluoro rubber, fluoro-silicone rubber, or the like is preferred. The elastic layer 15*b* in the present exemplary embodiment is made of silicone rubber with a thickness of about 4 mm. The release layer 15*c* is desirably made of a material excellent in releasing property and heat resistance, and a fluoride-based resin such as PFA, PTFE, or FEP is preferred. The release layer 15*c* in the present exemplary embodiment is made of PFA with a thickness of about 50 μm.

The pressure roller 15 has the left and right sides of a core shaft part 15*d* rotatably disposed between left and right side plates 61L and 61R of the apparatus frame 60 with bearing members 62 between the left and right side plates 61L and 61R. A driving gear 47 is concentrically disposed on the right of the core shaft part 15*d*. When a driving force of a motor (not illustrated) controlled by a control unit (not illustrated) is transferred to the gear 47, the pressure roller 15 is rotationally driven as a driven rotary body at a predetermined peripheral velocity.

A pressure mechanism will be described. The pressure springs 48L and 48R are in contact with the force receiving parts 40*c* of the flanges 40L and 40R, respectively. The pressure spring 48L is arranged so as to be compressed between a left-side spring receiving part 67L of a top plate 66 of the apparatus frame 60 and the force receiving part 40*c* of the flange 40L. The pressure spring 48R is arranged so as to be compressed between a right-side spring receiving part 67R of the top plate 66 of the apparatus frame 60 and the force receiving part 40*c* of the flange 40R. Due to reaction force of the pressure springs 48L and 48R, the biasing force acts on the left and right protruding parts 16*a*L and 16*a*R of the stay 16 of the film unit 50 via the flanges 40L and 40R. Accordingly, the guide member 17 having the member-to-be-slid-contact 14 and the pressure roller 15 nips the film 13 against the elasticity of the elastic layer 15*b* of the pressure roller 15. The fixing nip portion N is formed between the film 13 and the pressure roller 15.

The pressure roller 15 and the film unit 50 are arranged substantially in parallel to each other and are disposed between the side plates 61L and 61R of the apparatus frame 60. The vertical groove parts 40*e* of the flanges 40L and 40R of the film unit 50 are engaged with guide slits (not illustrated) provided in the side plates 61L and 61R, respectively. Accordingly, the flanges 40L and 40R are held so as to be slidable on the side plates 61L and 61R, respectively, and movable toward the film 13.

A distance R between the restriction surfaces 40*a* of the flanges 40 arranged on the left and right sides is set to be longer than the width of the film 13. The distance R between the restriction surfaces 40*a* of the flanges 40 in the present exemplary embodiment is set to 246 mm.

Figure 9:
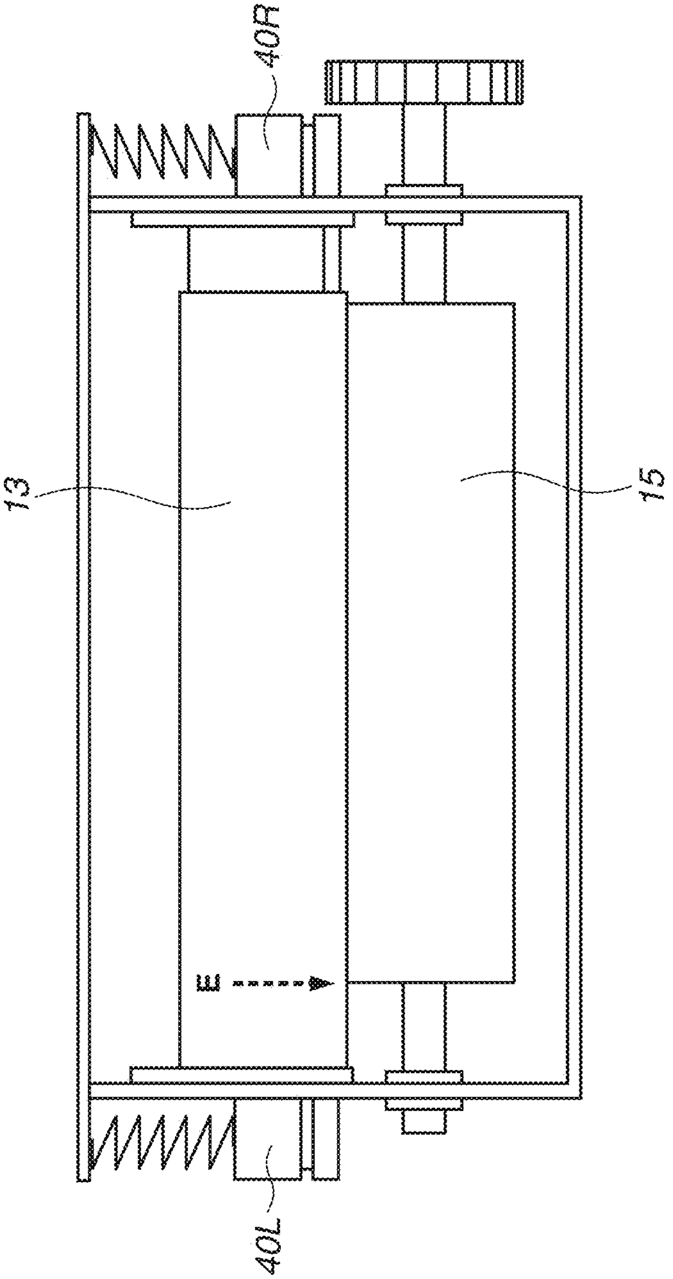
FIG. 9 is a schematic diagram illustrating the state in which film shift has occurred.

FIG. 9 is a diagram illustrating the state in which a leftward shift force is generated on the film 13 and the film 13 is in contact with the left flange 40L. Because the film 13 is restricted by the flange 40L, the film 13 cannot move leftward any longer. In this state, if the leftward shift force is continuously generated, a large deformation stress is applied to the part of the film 13 corresponding to an end portion position E of the pressure roller 15 indicated by a dotted-line arrow in the drawing. As a result, the resistance value of the conductive layer 13*b* may increase.

Figure 10A:
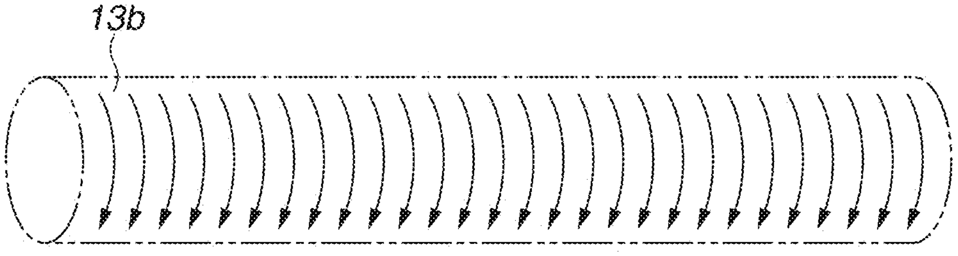
FIGS. 10A and 10B are schematic views of induction current with increase in the resistance of a part of a conductive layer.
Figure 10B:
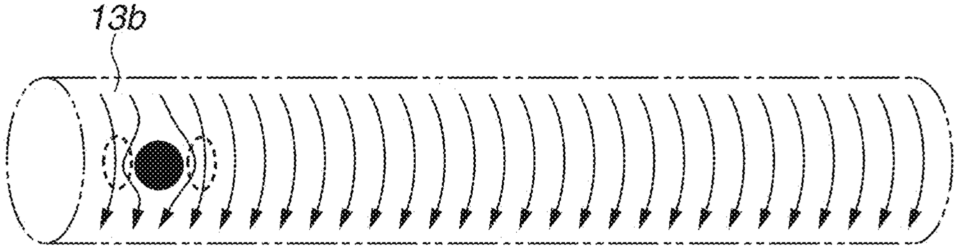

FIGS. 10A and 10B are schematic diagrams describing changes in the flow of induction current in a case where a portion of the conductive layer 13*b* increases in resistance. FIG. 10A is a conceptual diagram illustrating the moment when the induction current is flowing in the conductive layer 13*b* with magnetic flux generated by the energizing coil 19 without occurrence of a resistance increase. In this case, a predetermined amount of current flows into the entire conductive layer 13*b* in a substantially even manner, and the conductive layer 13*b* evenly generates heat. On the other hand, FIG. 10B illustrates the state where the resistance increases at a part indicated with a black circle in the diagram. Because the induction current flows so as to bypass the black-circle part, the amount of generated heat at the black-circle part decreases. In addition, at both sides of the black-circle part, the current density becomes high and the amount of generated heat increases. As above, in a system in which current flows into the film 13 to cause the film 13 to generate Joule heat, it is necessary to reduce damage to the part into which the current flows as much as possible.

On the other hand, even if the lateral shift of the film 13 occurs to generate a deformation stress at the end portion position E of the pressure roller 15, there is no problem in an area in which no current flows. Thus, taking advantage of the fact that the width of the conductive layer 13*b* can be set independently from the width of the film 13, an apparatus configuration satisfying Expression 1 below is adopted.

$$D > R + C - F \qquad \text{(Expression 1)}$$

where D is the pressure roller width, R is the inter-flange distance, C is the conductive layer width, and F is the film width.

The effectiveness of the configuration satisfying the relationship in Expression 1 to solve the above-described issue will be described in comparison with comparative examples. In the comparison, the inter-flange distance R that is the distance between the flange 40L and the flange 40R is 246 mm and the width F of the film 13 is 240 mm, which are in common with the comparative examples, and the width C of the conductive layer 13*b* and the width D of the pressure roller 15 are different among the first exemplary embodiment and the comparative examples. Table 1 indicates the configurations in the first exemplary embodiment and Comparative Examples 1 and 2, the values calculated by the inter-flange distance R+the conductive layer width C−the film width F, the satisfaction/dissatisfaction of Expression 1.

TABLE 1

| | Conductive layer width C | Pressure roller width D | Calculation result | Expression 1 |
|---|---|---|---|---|
| First exemplary embodiment | 224 mm | 232 mm | 230 mm | Satisfied |
| Comparative Example 1 | 224 mm | 228 mm | 230 mm | Dissatisfied |
| Comparative Example 2 | 228 mm | 232 mm | 234 mm | Dissatisfied |

Figure 11A:
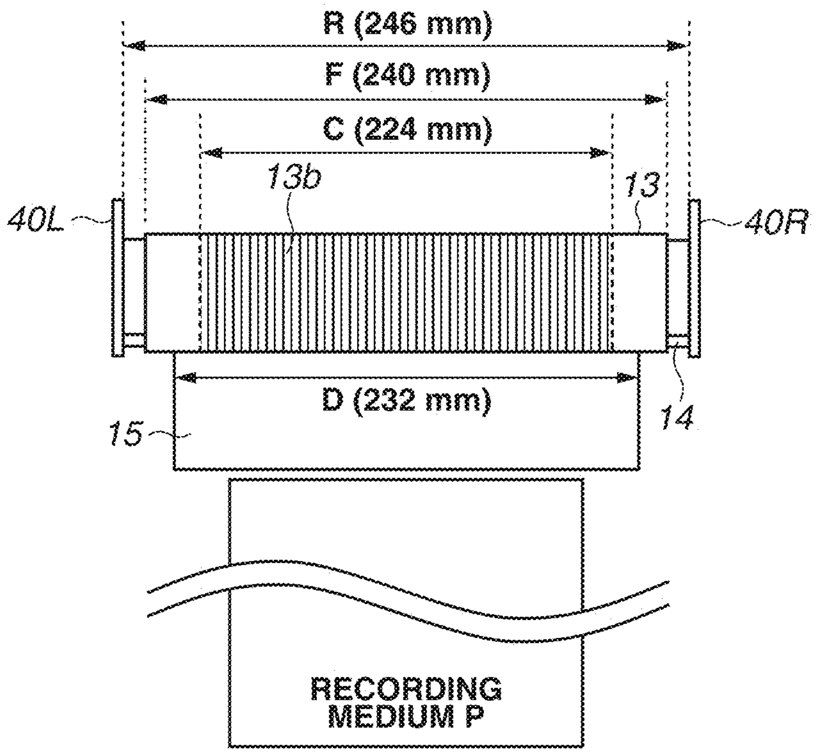
FIGS. 11A and 11B are schematic diagrams describing a film shift state in a first exemplary embodiment.
Figure 11B:
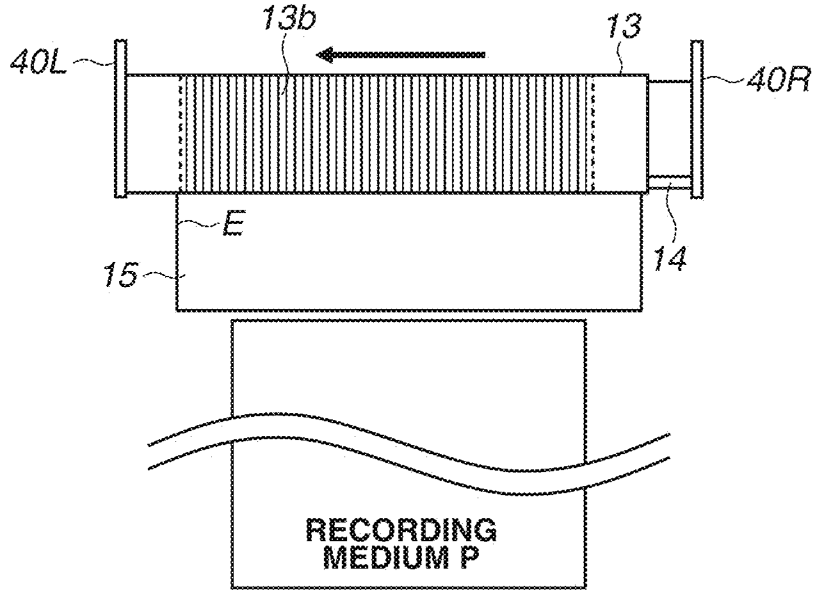

FIGS. 11A and 11B are schematic diagrams describing occurrence of a film shift in the first exemplary embodiment. FIG. 11A illustrates the state without occurrence of film shift, and FIG. 11B illustrates the state where a film shift has occurred leftward and the left end portion of the film 13 is in contact with the left flange 40L. In the first exemplary embodiment, the width C of the conductive layer 13*b* is 224 mm, and the width D of the pressure roller 15 is 232 mm, and the conductive layer 13*b* is not present at the end portion position E of the pressure roller 15 under deformation stress. That is, the increase in the resistance of the conductive layer 13*b* due to the deformation stress can be suppressed.

Figure 12A:
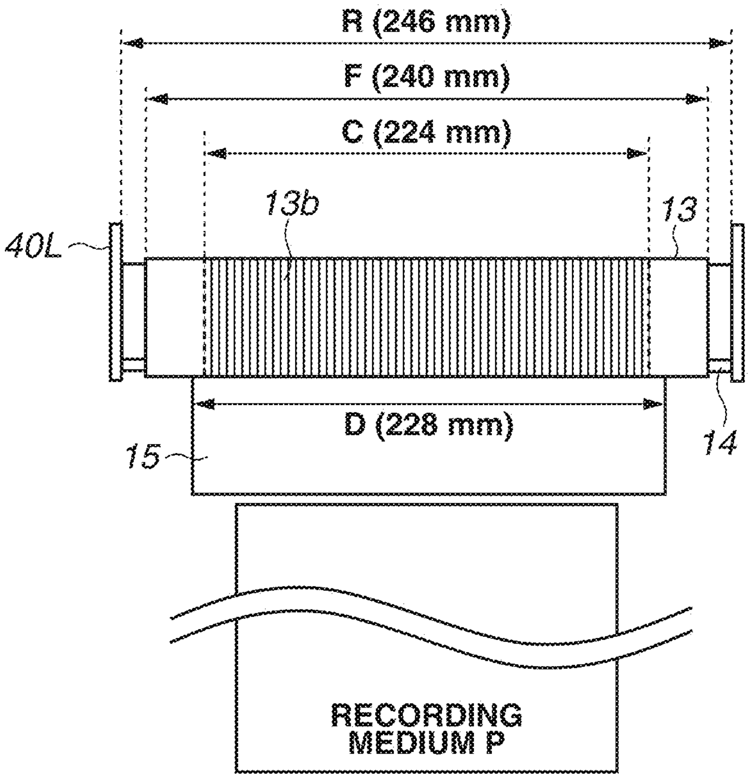
FIGS. 12A and 12B are schematic diagrams describing a film shift state in Comparative Example 1.
Figure 12B:
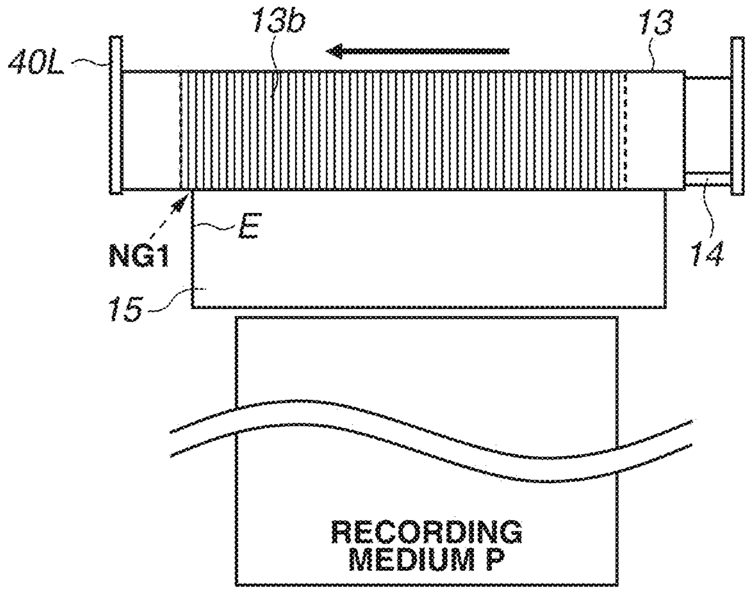

FIGS. 12A and 12B are schematic diagrams describing the occurrence of a film shift in Comparative Example 1, and the difference between FIGS. 12A and 12B is the same as that in the first exemplary embodiment. In Comparative Example 1, a film 13 is shorter than that in the first exemplary embodiment, and the width of a conductive layer 13*b* is 224 mm and the length of a pressure roller 15 is 228 mm. When the film 13 contacts a left flange 40L, the conductive layer 13*b* is present at an end portion position E of the pressure roller 15 under deformation stress. As a result, the resistance of the conductive layer 13*b* due to the deformation stress increases (NG1 in FIG. 12B).

Figure 13A:
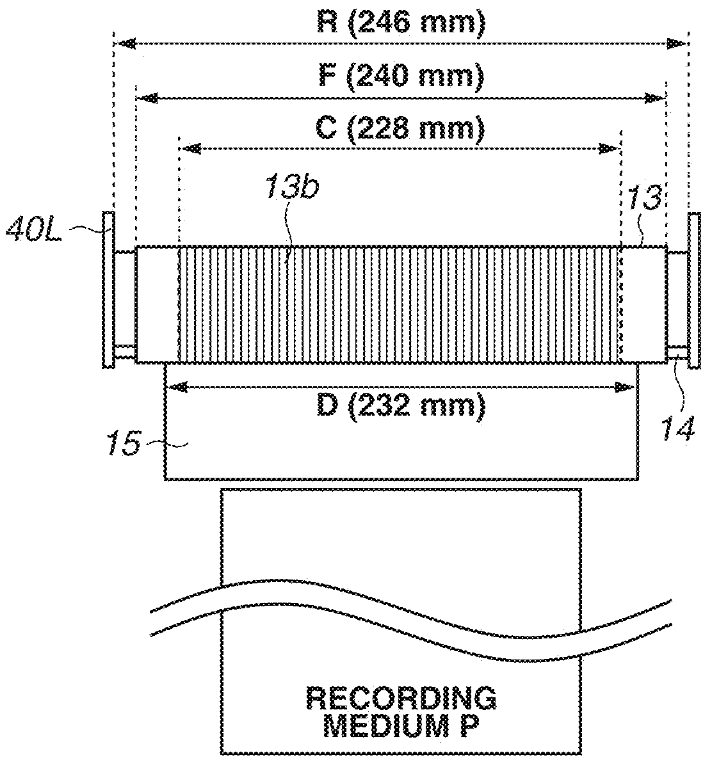
FIGS. 13A and 13B are schematic diagrams describing a film shift state in Comparative Example 2.
Figure 13B:
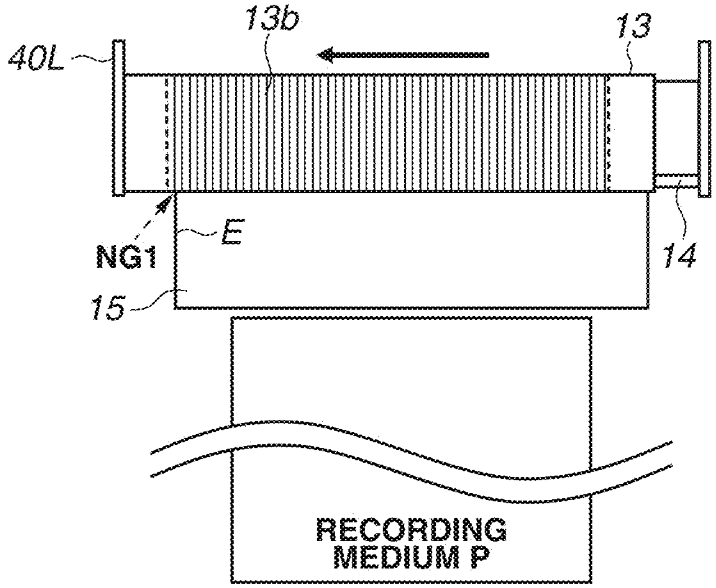

FIGS. 13A and 13B are schematic diagrams describing occurrence of a film shift in Comparative Example 2, and the difference between FIGS. 13A and 13B is the same as that in the first exemplary embodiment. In Comparative Example 2, a conductive layer 13*b* is wider than that in the first exemplary embodiment, and the width of a conductive layer 13*b* is 228 mm and the length of a pressure roller 15 is 232 mm. When the film 13 contacts a left flange 40L, the conductive layer 13*b* is present at an end portion position E of the pressure roller 15 under deformation stress. As a result, the resistance of the conductive layer 13*b* due to the deformation stress increases (NG1 in FIG. 13B).

Figure 14A:
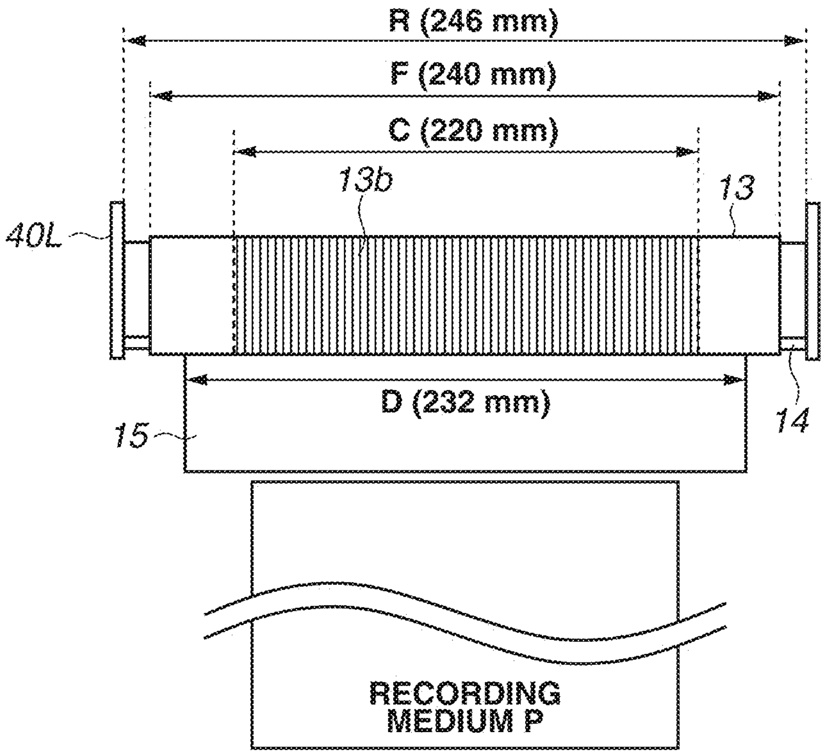
FIGS. 14A and 14B are schematic diagrams describing a film shift state in Comparative Example 3.
Figure 14B:
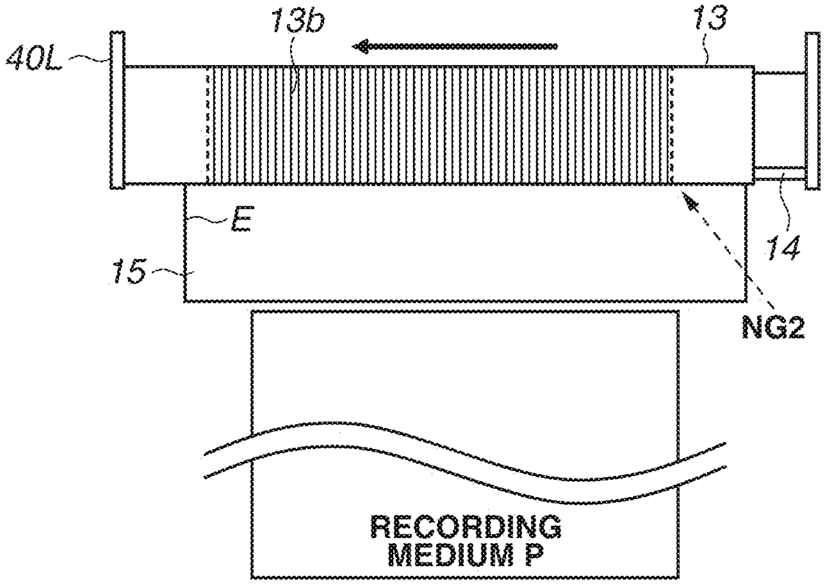

FIGS. 14A and 14B are schematic diagrams describing occurrence of a film shift in Comparative Example 3, and the difference between FIGS. 14A and 14B is the same as that in the first exemplary embodiment. As illustrated in Table 2, in Comparative Example 3, the conductive layer width is smaller than that in the first exemplary embodiment, and the width of a conductive layer 13*b* is 220 mm, and the width of a pressure roller 15 is 232 mm. Even in the state where a film 13 is in contact with a left flange 40L, the conductive layer 13*b* is not present at an end portion position E of the film 13 under deformation stress. That is, the increase in the resistance of the conductive layer 13*b* due to the deformation stress can be suppressed.

TABLE 2

| | Conductive layer width C | Pressure roller width D | Calculation result | Expression 1 |
|---|---|---|---|---|
| First exemplary embodiment | 224 mm | 232 mm | 230 mm | Satisfied |
| Comparative Example 3 | 220 mm | 232 mm | 226 mm | Satisfied |

However, in the state where the film 13 is shifted, the conductive layer 13*b* does not completely cover the width of the maximum-sized feedable recording medium with which fixability should be secured (maximum width T of a toner image formed on the recording medium) (NG2 in FIG. 14B). That is, the film 13 cannot apply a predetermined amount of heat to the recording medium P in a substantially even manner. Thus, it is preferred to add a limiting condition so as to satisfy not only Expression 1 but also Expression 2 below.

$$T < C + F - R \quad \text{(Expression 2)}$$

where T is the fixability secured width.

TABLE 3

| | Conductive layer width C | Pressure roller width D | Calculation result | Expression 2 |
|---|---|---|---|---|
| First exemplary embodiment | 224 mm | 232 mm | 218 mm | Satisfied |
| Comparative Example 3 | 220 mm | 232 mm | 214 mm | Dissatisfied |

In the first exemplary embodiment where Expression 2 is satisfied, the conductive layer 13*b* covers the maximum width T (214.9 mm) even in the state where the film 13 is shifted, so that it is possible to apply a predetermined amount of heat to the recording medium P in a substantially even manner.

Figure 15A:
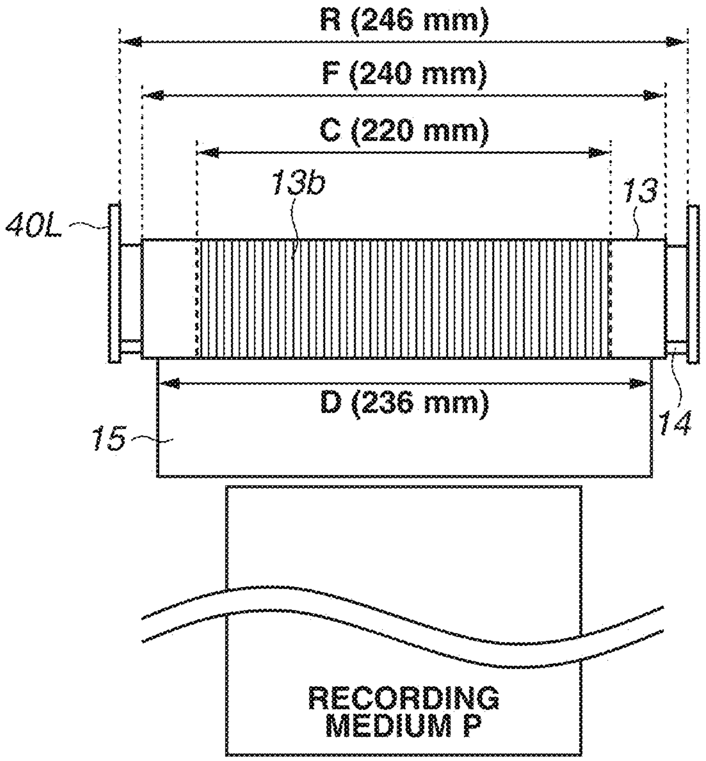
FIGS. 15A and 15B are schematic diagrams describing a film shift state in Comparative Example 4.
Figure 15B:
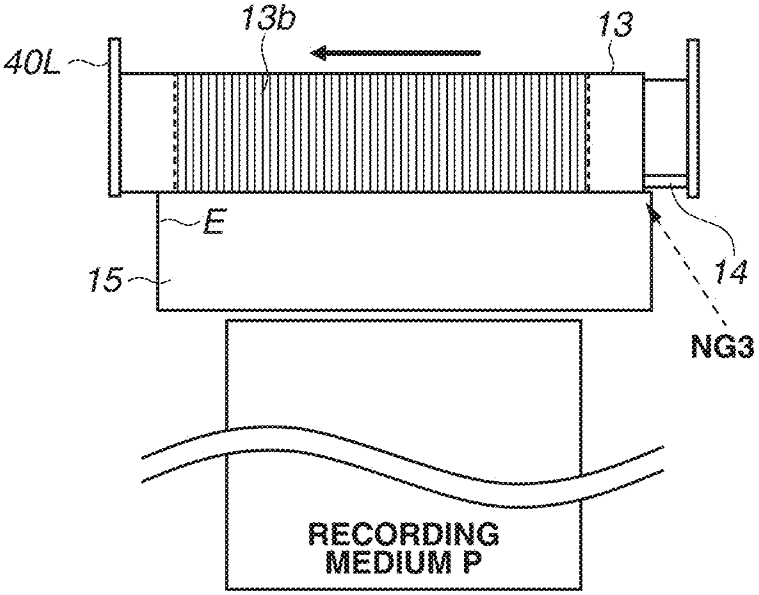

FIGS. 15A and 15B are schematic diagrams describing occurrence of a film shift in Comparative Example 4, and the difference between FIGS. 15A and 15B is the same as that in the first exemplary embodiment. In Comparative Example 4, a pressure roller 15 is longer than that in the first exemplary embodiment, and the width of a conductive layer 13*b* is 220 mm, and the width of the pressure roller 15 is 236 mm. Even in the state where a film 13 is shifted and is in contact with a left flange 40L, the conductive layer 13*b* is not present at an end portion position E of the film 13 under deformation stress. That is, the increase in the resistance of the conductive layer 13*b* due to the deformation stress can be suppressed.

TABLE 4

| | Conductive layer width C | Pressure roller width D | Calculation result | Expression 1 |
|---|---|---|---|---|
| First exemplary embodiment | 224 mm | 232 mm | 230 mm | Satisfied |
| Comparative Example 4 | 220 mm | 236 mm | 230 mm | Satisfied |

However, the surface of the pressure roller 15 comes into slide contact with a member-to-be-slid-contact 14 at the right end portion of the pressure roller 15, and the pressure roller 15 becomes damaged (NG3 in FIG. 15B).

Thus, it is preferred to add a limiting condition so as to further satisfy Expression 3 below.

$$D < F \times 2 - R \quad \text{(Expression 3)}$$

TABLE 5

| | Conductive layer width C | Pressure roller width D | Calculation result | Expression 3 |
|---|---|---|---|---|
| First exemplary embodiment | 224 mm | 232 mm | 234 mm | Satisfied |

TABLE 5-continued

| | Conductive layer width C | Pressure roller width D | Calculation result | Expression 3 |
|---|---|---|---|---|
| Comparative Example 3 | 220 mm | 236 mm | 234 mm | Dissatisfied |

In the first exemplary embodiment where Expression 3 is satisfied, the right end portion of the pressure roller 15 presses the member-to-be-slid-contact 14 with the film 13 between the right end portion of the pressure roller 15 and the member-to-be-slid-contact 14, and the pressure roller 15 does not directly contact the member-to-be-slid-contact 14.

As described above, configuring the fixing device A so as to satisfy Expression 1 suppresses increase in the resistance of the conductive layer 13*b*. Further, satisfying Expression 2 also suppresses increase in the resistance of the conductive layer 13*b* while applying a predetermined amount of heat to the recording medium P in a substantially even manner. Moreover, satisfying Expression 3 also suppresses increase in the resistance of the conductive layer 13*b* while preventing the pressure roller 15 from directly contacting the member-to-be-slid-contact 14.

The above-described exemplary embodiment discloses at least the following fixing device.

Item 1

A fixing device including a cylindrical film that includes a base layer and a conductive layer lower in resistance than the base layer, a member-to-be-slid-contact that is arranged in the internal space of the film and with which the rotating film comes into slide contact, a pressure member that contacts the outer peripheral surface of the film and nips the film together with the member-to-be-slid-contact to form a fixing nip portion between the film and the pressure member, and a restriction member that includes a restriction surface restricting movement of the film in a longitudinal direction of the film when the film moves in the longitudinal direction, wherein in the fixing device, electrical current flows in a circling direction to the conductive layer to cause the conductive layer to generate Joule heat, and a recording medium nipped and conveyed by the fixing nip portion is heated with the heat, thereby a toner image formed on the recording medium is fixed to the recording medium, the restriction member is arranged at positions facing end surfaces of the film in the longitudinal direction, with respect to the longitudinal direction, the conductive layer into which the electrical current flows in the circling direction is not provided in areas of the end portions of the film but is provided in an area between the end portion areas, and a relationship $D>R+C-F$ is satisfied, where F is the width of the film, C is the width of the conductive layer, R is the distance between the two restriction surfaces, and D is the width of the pressure member.

Item 2

The fixing device according to item 1, wherein a relationship $T<C+F-R$ is satisfied, where T is the maximum width of the toner image formed on the recording medium with respect to the longitudinal direction.

Item 3

The fixing device according to item 1 or 2, wherein a relationship $D<F\times 2-R$ is satisfied.

Item 4

The fixing device according to any one of items 1 to 3, further including an energizing coil that is arranged in the internal space of the film and includes a helical part that includes a helical axis substantially parallel to the longitudinal direction, and a magnetic core with end surfaces that is arranged inside the helical part, wherein induction current is generated in the conductive layer by applying an alternating-current voltage to the energizing coil.

Item 5

The fixing device according to item 4, wherein the induction current flows in the rotation direction of the film.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-105937, filed Jun. 28, 2023, which is hereby incorporated by reference herein in its entirety.

What is claimed is:

1. A fixing device that fixes a toner image formed on a recording medium to the recording medium, the fixing device comprising:

a cylindrical film that includes a base layer and a conductive layer lower in resistance than the base layer;

a member-to-be-slid-contact that is arranged in an internal space of the film and with which the film while rotating comes into slide contact;

a pressure member that contacts an outer peripheral surface of the film, the pressure member nipping the film together with the member-to-be-slid-contact to form a fixing nip portion between the film and the pressure member; and a restriction member that has a restriction surface configured to restrict movement of the film in a longitudinal direction of the film when the film moves in the longitudinal direction, the restriction member includes a first restriction member and a second restriction member, wherein in the fixing device, electrical current flows to the conductive layer in a circling direction to cause the conductive layer to generate Joule heat, and the recording medium nipped and conveyed by the fixing nip portion is heated with the heat, thereby the toner image formed on the recording medium is fixed to the recording medium, wherein the first restriction member is arranged at a position facing one end surface of the film in the longitudinal direction, and the second restriction member is arranged at a position facing the other end surface of the film in the longitudinal direction, wherein, with respect to the longitudinal direction, the conductive layer into which the electric current flows in the circling direction is not provided in areas of the end portions of the film but is provided in an area between the areas of the end portions, and wherein, with respect to the longitudinal direction, a relationship $D>R+C-F$ is satisfied where F is a width of the film, C is a width of the conductive layer, R is a distance between the two restriction surfaces, and D is a width of the pressure member.

2. The fixing device according to claim 1, wherein, with respect to the longitudinal direction, a relationship $T<C+F-R$ is satisfied, where T is a maximum width of the toner image formed on the recording medium.

3. The fixing device according to claim 2, wherein a relationship $D<F\times 2-R$ is satisfied.

4. The fixing device according to claim 1, further comprising:

an exciting coil that is arranged in the internal space of the film and includes a helical axis substantially parallel to the longitudinal direction; and a magnetic core with end surfaces that is arranged inside the helical part, wherein induction current is generated in the conductive layer by applying an alternating-current voltage to the exciting coil.

5. The fixing device according to claim 4, wherein the induction current flows in a rotation direction of the film.

6. The fixing device according to claim 1, wherein the distance R Is larger than the width F.

7. The fixing device according to claim 6, wherein when the one end surface of the film contacts the restriction surface of the first restriction member, all area of the conductive layer in the longitudinal direction is positioned in an area of the fixing nip portion in the longitudinal direction, and when the other end surface of the film contacts the restriction surface of the second restriction member, all area of the conductive layer in the longitudinal direction is positioned in an area of the fixing nip portion in the longitudinal direction.

8. A fixing device that fixes a toner image formed on a recording medium to the recording medium, the fixing device comprising:

a cylindrical film that includes a base layer and a conductive layer lower in resistance than the base layer;

a member-to-be-slid-contact that is arranged in an internal space of the film and with which the film while rotating comes into slide contact;

a pressure member that contacts an outer peripheral surface of the film, the pressure member nipping the film together with the member-to-be-slid-contact to form a fixing nip portion between the film and the pressure member;

a first restriction member disposed at a position facing one end surface of the film in a longitudinal direction of the film and having a first restriction surface configured to restrict movement of the film in the longitudinal direction by receiving the one end surface of the film when the film moves in one longitudinal direction; and a second restriction member disposed at a position facing the other end surface of the film in the longitudinal direction and having a second restriction surface configured to restrict movement of the film in the longitudinal direction by receiving the other end surface of the film when the film moves in the other longitudinal direction, wherein in the fixing device, electrical current flows to the conductive layer to cause the conductive layer to generate heat, and the recording medium nipped and conveyed by the fixing nip portion is heated with the heat, thereby the toner image formed on the recording medium is fixed to the recording medium, wherein, with respect to the longitudinal direction, the conductive layer into which the electric current flows in the circling direction is not provided in areas of end portions of the film but is provided in an area between areas of the end portions, and wherein, with respect to the longitudinal direction, a relationship $D>R+C-F$ is satisfied where F is a width of the film, C is a width of the conductive layer, R is a distance between the first restriction surface and the second restriction surface, and D is a width of the pressure member.

9. The fixing device according to claim 8, wherein, with respect to the longitudinal direction, a relationship $T<C+F-R$ is satisfied, where T is a maximum width of the toner image formed on the recording medium.

10. The fixing device according to claim 9, wherein a relationship $D<F\times 2-R$ is satisfied.

11. The fixing device according to claim 8, further comprising:

an exciting coil that is arranged in the internal space of the film and includes a helical axis substantially parallel to the longitudinal direction; and a magnetic core with end surfaces that is arranged inside the helical part, wherein induction current as the electrical current is generated in the conductive layer by applying an alternating-current voltage to the exciting coil.

12. The fixing device according to claim 11, wherein the induction current flows in a rotation direction of the film.

13. The fixing device according to claim 8, wherein the distance R Is larger than the width F.

14. The fixing device according to claim 13, wherein when the one end surface of the film contacts the first restriction surface of the first restriction member, all area of the conductive layer in the longitudinal direction is positioned in an area of the fixing nip portion in the longitudinal direction, and when the other end surface of the film contacts the second restriction surface of the second restriction member, all area of the conductive layer in the longitudinal direction is positioned in an area of the fixing nip portion in the longitudinal direction.

* * * * *